United States Patent [19]

Sasaki et al.

[11] Patent Number: 4,980,418

[45] Date of Patent: Dec. 25, 1990

[54] THERMOPLASTIC RESINS HAVING EXCELLENT THERMAL RESISTANCE AND MOLDABILITY AND PROCESSES FOR PREPARING SAME

[75] Inventors: Isao Sasaki; Naoki Yamamoto; Hiroshi Mori, all of Saeki; Akira Nakata, Ohtake, all of Japan

[73] Assignee: Mitsubishi Rayon Co., Ltd., Tokyo, Japan

[21] Appl. No.: 372,195

[22] Filed: Jun. 26, 1989

Related U.S. Application Data

[62] Division of Ser. No. 94,444, Sep. 9, 1987, abandoned.

[30] Foreign Application Priority Data

Sep. 10, 1986 [JP] Japan .................................. 61-212992

[51] Int. Cl.$^5$ ............................................. C08G 81/00
[52] U.S. Cl. ...................... 525/132; 525/35; 525/167; 525/177
[58] Field of Search ................ 525/35, 167, 168, 132, 525/177

[56] References Cited

U.S. PATENT DOCUMENTS

| | | | |
|---|---|---|---|
| 3,291,859 | 12/1966 | Tobolsky | 525/190 |
| 3,752,802 | 8/1973 | Stephen | 525/25 |
| 3,792,118 | 2/1974 | Kishikawa | 525/132 |
| 4,804,711 | 2/1989 | Ishihara | 525/146 |

OTHER PUBLICATIONS

Sorenson, W. R., et al., *Preparative Methods of Polymer Chemistry,* Interscience Publishers NY, pp. 90–92, 137–138, (1968).

*Primary Examiner*—Patricia Short
*Attorney, Agent, or Firm*—Cushman, Darby & Cushman

[57] ABSTRACT

Disclosed are thermoplastic resins comprising block copolymers composed of polyester segments and vinyl polymer segments and having excellent thermal resistance and moldability, as well as several processes for preparing same. Among these thermoplastic resins, block copolymers formed of amorphous aromatic polyester segments and polystyrene resin segments are also useful as optical resins.

6 Claims, No Drawings

THERMOPLASTIC RESINS HAVING EXCELLENT THERMAL RESISTANCE AND MOLDABILITY AND PROCESSES FOR PREPARING SAME

This is a division of application No. 07/094,444, filed Sept. 9, 1987, now abandoned.

BACKGROUND OF THE INVENTION

1. Field of the Invention

This invention relates to thermoplastic resins having excellent thermal resistance and moldability and suitable for use as molding materials, as well as to processes for preparing such thermoplastic resins. Among the thermoplastic resins of the present invention, those having a specific chemical structure additionally have excellent optical properties and can be used as optical resins.

2. Description of the Prior Art

Polyesters, particularly aromatic polyesters, are being used as so-called engineering plastics because of their excellent thermal resistance and mechanical properties. Vinyl polymers, though being generally inferior in thermal resistance to aromatic polyesters, are also being widely used because of their excellent moldability and mechanical properties. However, from the viewpoint of moldability, aromatic polyesters are disadvantageous in that they have a high molding temperature and poor fluidity because of their high thermal resistance. Moreover, crystalline polyesters have low impact strength, especially when notched, and are generally used in the form reinforced with glass fibers and the like. On the other hand, vinyl polymers as typified by polymethyl methacrylate and polystyrene have excellent moldability, but have low thermal resistance, so that they are distinct from so-called engineering plastics. As described above, these polymers have both merits and demerits. Accordingly, there is a demand for the development of a material having a desirable combination of their merits.

At the same time, polymethyl methacrylate and polycarbonates are being commonly used as optical resins. However, polymethyl methacrylate, though having excellent optical properties, is disadvantageous in that it has low thermal resistance and high water absorption, and in that molded articles formed thereof are subject to deformation. On the other hand, polycarbonates have excellent thermal resistance and resistance to moisture absorption, but are disadvantageous in that they have poor moldability and exhibit a high degree of birefringence due to the orientation produced during molding. For optical resins, it is also desirable to develop a material in which the merits of these polymers are appropriately combined.

As an attempt to improve the moldability of engineering plastics while retaining their thermal resistance and mechanical strength, it has been known to prepare a blend of compatible polymers (e.g., polyphenylene ether and polystyrene). However, since many polymers are generally incompatible with each another, it is practically impossible, with rare exceptions, to improve the properties of various engineering plastics by polymer blending.

Moreover, many attempts have also been made to improve the properties of optical resins. For example, the properties of polymethyl methacrylate have been improved by copolymerization with hydrophobic monomers, and the molecular orientation of polycarbonates has been weakened by a decrease in molecular weight and improvements in injection molding technique. In addition, it is disclosed in U.S. Pat. No. 4,373,065 that birefringence can be offset by blending compatible polymers. However, since this technique is only effective for compatible polymers, its applicability is rather limited.

SUMMARY OF THE INVENTION

It is an object of the present invention to provide a novel molding material in which the high thermal resistance and mechanical strength of polyesters, particularly aromatic polyesters, are combined with the good moldability of vinyl polymers.

It is another object of the present invention to provide a novel optical resin having excellent optical properties along with high thermal resistance, high mechanical strength and good moldability.

It is still another object of the present invention to provide a process for preparing a block copolymer formed of polyester segments and vinyl polymer segments and having the aforesaid excellent properties.

According to the present invention, there is provided a thermoplastic resin comprising a block copolymer composed of polyester segments and vinyl polymer segments.

According to the present invention, there are further provided the following three types of processes for preparing a block copolymer composed of polyester segments and vinyl polymer segments:

(A) A process for preparing a block copolymer composed of polyester segments and vinyl polymer segments which comprises the steps of (a) subjecting a vinyl monomer to radical polymerization by using an azo-containing dicarboxylic acid, diol or diester as the polymerization initiator, to form vinyl polymer segments having terminal carboxyl, hydroxyl or ester groups, and (b) effecting polycondensation for the formation of polyester segments while using the vinyl polymer segments as a part of the dicarboxylic acid, diol or hydroxycarboxylic acid component.

(B) A process for preparing a block copolymer composed of polyester segments and vinyl polymer segments which comprises the steps of (a) effecting polycondensation for the formation of polyester segments while using an azo-containing dicarboxylic acid dichloride as a part of the dicarboxylic acid component, to form azo-containing polyester segments, and (b) subjecting a vinyl monomer to radical polymerization by using the azo-containing polyester segments as the polymerization initiator.

(C) A process for preparing a block copolymer composed of polyester segments and vinyl polymer segments which comprises the steps of (a) subjecting a vinyl monomer to radical polymerization by using an azo-containing dicarboxylic acid dichloride as the polymerization initiator, to form vinyl polymer segments having terminal carboxylic acid chloride groups, and (b) effecting polycondensation for the formation of polyester segments while using the vinyl polymer segments as a part of the acid component.

DETAILED DESCRIPTION OF THE PREFERRED EMBODIMENTS

The thermoplastic resin of the present invention comprises a block copolymer composed of polyester segments and vinyl polymer segments. No limitation is placed on the manner in which the polyester segments and the vinyl polymer segments are joined to each other. Specifically, the block copolymer can be of the A$(B-A)_n$B type, the A$(B-A)_m$ type or a combination thereof, where A represents a polyester segment, B a vinyl polymer segment, n an integer of 0 or more and m an integer of 1 or more.

When a vinyl polymer is simply blended with a polyester, the resulting composition has poor compatibility and low performance in most cases. By contrast, by preparing a block copolymer composed of a vinyl polymer and a polyester, there can be obtained a novel resin combining the desirable properties of both the vinyl polymer and the polyester. Moreover, a resin having a combination of properties suitable for the intended purpose can also be prepared by properly selecting the types of the polyester segments and vinyl polymer segments constituting the block copolymer.

By way of example, the present invention can provide various thermoplastic resins as described below:

(1) When amorphous polyester segments having a high glass transition temperature are combined with vinyl polymer segments having a relatively high glass transition temperature, there is obtained a transparent molding material having a well-balanced combination of thermal resistance, moldability and mechanical properties.

(2) When amorphous or crystalline polyester segments having a high glass transition temperature or melting point are combined with vinyl polymer segments having a glass transition temperature equal to or lower than room temperature, there is obtained a molding material having a combination of excellent thermal resistance, moldability and impact resistance.

(3) When amorphous polyester segments having a high glass transition temperature and exhibiting positive birefringence are combined with vinyl polymer segments having a relatively high glass transition temperature and exhibiting negative birefringence, there is obtained an optical resin having a well-balanced combination of thermal resistance, moldability, mechanical properties and optical properties. However, it is to be understood that the present invention is not limited to these specific thermoplastic resins.

Moreover, the block copolymer of the present invention can also be used as a compatibilizing agent for a polycondensation polymer and a vinyl polymer to obtain a material having excellent moldability and thermal resistance.

As used herein, the term "molding material" denotes materials that can be molded into articles of desired shapes and sizes according to various techniques such as injection molding, extrusion and pressure molding, and the term "optical resin" denotes resins having a high degree of transparency suitable for use as optical discs, optical fibers and optical lenses.

In the block copolymer of the present invention, the polyester segments and the vinyl polymer segments are preferably present in a weight ratio ranging from 80:20 to 20:80. If the weight ratio is outside this range, the properties of the block copolymer will tend to be governed by the properties of either the polyester segments or the vinyl polymer segments. No particular limitation is placed on the lengths of the polyester segments or the vinyl polymer segments. However, in order to cause the block copolymer to exhibit the desirable properties of the respective segments, both the polyester segments and the vinyl polymer segments preferably have a number-average molecular weight of 500 or more.

The polyester segments which are one of the two constituents of the block copolymer of the present invention comprise a condensation product composed chiefly of a hydroxycarboxylic acid or a dicarboxylic acid and a diol.

Examples of the aforesaid hydroxycarboxylic acid include p-hydroxybenzoic acid, p-hydroxymethylbenzoic acid, p-hydroxyethylbenzoic acid, 2-(4-hydroxyphenyl)-2-(4'-carboxyphenyl)propane and the like. These hydroxycarboxylic acids may be used alone or in admixture of two or more.

Examples of the aforesaid dicarboxylic acid include aromatic dicarboxylic acids such as terephthalic acid, isophthalic acid, phthalic acid, diphenyl-m,m'-dicarboxylic acid, diphenyl-p,p'-dicarboxylic acid, diphenylmethane-m,m'-dicarboxylic acid, diphenylmethane-p,p'-dicarboxylic acid, benzophenone-4,4'-dicarboxylic acid, p-phenylenediacetic acid, etc.; and aliphatic dicarboxylic acids such as adipic acid, pimelic acid, sebacic acid, succininc acid, malonic acid, malic acid, citric acid, etc. These dicarboxylic acids may be used alone or in admixture of two or more.

Among the foregoing dicarboxylic acids, terephthalic acid and isophthalic acid are preferred because block copolymers containing terephthalic acid and/or isophthalic acid as principal acid components have high thermal resistance.

Examples of the aforesaid diol include aromatic diols such as hydroquinone, resorcinol, 2,2-bis(4-hydroxyphenyl)propane, 2,2-bis(4-hydroxy-3,5-dichlorophenyl)propane, 1,1-bis(4-hydroxyphenyl)-cyclohexane, 4,4'-dihydroxydiphenyl, 4,4'-dihydroxydiphenyl sulfone, 4,4'-dihydroxydiphenyl ether, 4,4'-diphenyl sulfide, 4,4'-dihydroxydiphenyl ketone, 4,4'-dihydroxydiphenylmethane, etc.; and aliphatic diols such as ethylene glycol, propylene glycol, 1,4-butanediol, pentamethylene glycol, octamethylene glycol, hydrogenated bisphenol A, etc. These diols may be used alone or in admixture of two or more.

Among the foregoing diols, 2,2-bis(4-hydroxyphenyl)propane is preferred because it imparts excellent thermal resistance and moldability to the resulting block copolymer.

Among various types of polyester segments formed of the above-described components, those consisting essentially of polyethylene terephthalate, polybutylene terephthalate or an whole-aromatic polyester are preferred from the viewpoint of thermal resistance, mechanical properties and other properties.

The vinyl polymer segments which are the other constituent of the block copolymer of the present invention may comprise any polymeric product obtained by polymerizing a radical-polymerizable vinyl monomer. Preferred examples of the aforesaid vinyl monomer include (meth)acrylic esters, monoalkenyl aromatic compounds, vinyl cyanides and maleimides. More specifically, it is preferable to use one or more vinyl monomers selected from the group consisting of methyl (meth)-acrylate, ethyl (meth)acrylate, butyl acrylate, 2-ethylhexyl methacrylate, lauryl methacrylate, benzyl methacrylate, phenyl methacrylate, styrene, α-methylstyrene, acrylonitrile, N-phenylmaleimide, N-methylmaleimide, N-ethylmaleimide and N-butylmaleimide.

In order to prepare block copolymers suitable for use as optical resins, it is preferred to use a combination of amorphous aromatic polyester segments exhibiting positive birefringence, and vinyl polymer segments formed from an aromatic alkenyl monomer and exhibiting negative birefringence. More specifically, such block copolymers may be composed of (1) amorphous aromatic polyester segments formed from an aromatic dicarboxylic acid such as terephthalic acid or isophthalic acid and an aromatic diol such as 2,2-bis(4-hydroxyphenyl)-propane, and (2) vinyl polymer segments consisting of a polystyrene resin. The term "polyestyrene resin" as used herein denotes homopolymers or copolymers formed from one or more styrene monomers selected from styrene and its derivatives such as α-methylstyrene, β-methylstyrene, p-methylstyrene, p-ethylstyrene, p-chlorostyrene, m-chlorostyrene and p-nitrostyrene, as well as copolymers of one or more such styrene monomers and one or more vinyl monomers copolymerizable therewith. In order to achieve the excellent properties desired for optical resins, styrene and/or styrene derivatives is preferably contained in an amount of not less than 50 mole %.

In the diol component of the amorphous aromatic polyester segments, a small proportion of aliphatic diols such as ethylene glycol may be contained. Most preferably, the diol component comprises 2,2-(4-hydroxyphenyl)propane alone.

The amorphous aromatic polyester segments and the polystyrene segments are preferably present in a weight ratio ranging from 80:20 to 20:80. If the weight ratio is outside this range, the resulting block copolymer may exhibit a high degree of birefringence.

The thermoplastic resins of the present invention comprising block copolymers composed of polyester segments and vinyl polymer segments can be prepared by any of the following three processes.

In the first process, a vinyl monomer is subjected to radical polymerization by using an azo-containing dicarboxylic acid, diol or diester as the polymerization initiator. This radical polymerization can be carried out according to any well-known technique such as bulk polymerization, solution polymerization, suspension polymerization or emulsion polymerization. Thus, vinyl polymer segments having terminal carboxyl, hydroxyl or ester groups are formed. Then, using these vinyl polymer segments as a part of the dicarboxylic acid, diol or hydroxycarboxylic acid component, polycondensation for the formation of polyester segments is effected to yield a block copolymer. This polycondensation can be carried out according to any well-known technique such a melt polycondensation.

In the second process, polycondensation for the formation of polyester segments is effected using an azo-containing dicarboxylic acid dichloride as a part of the acid component. This polycondensation can be carried out according to any well-known technique such as interfacial polycondensation. Thus, azo-containing polyester segments are formed. By using these azo-containing polyester segments as the polymerization initiator, a vinyl monomer is subjected to radical polymerization according to any well-known technique such as solution polymerization. Thus, vinyl polymer segments are formed to yield a block copolymer.

In the third process, a vinyl monomer is subjected to radical polymerization by using an azo-containing dicarboxylic acid dichloride as the polymerization initiator. This radical polymerization can be carried out according to any of well-known technique such as bulk polymerization or solution polymerization. Thus, vinyl polymer segments having terminal carboxylic acid chloride groups are formed. Then, using these vinyl polymer segments as a part of the acid component, polycondensation for the formation of polyester segments is effected to yield a block copolymer. This polycondensation can be carried out according to any well-known technique such as solution polycondensation or interfacial polycondensation.

In preparing the thermoplastic resins of the present invention, any one of the aforesaid processes may suitably be chosen and employed according to the type of the polyester segments and vinyl polymer segments constituting the desired block copolymer. It is to be understood that the methods for preparing the thermoplastic resins of the present invention are not limited to the aforesaid three processes.

The aforesaid three processes will be more fully described hereinbelow.

In the first process, vinyl polymer segments are first formed through radical polymerization of a vinyl monomer by using an azo-containing dicarboxylic acid, diol or diester as the polymerization initiator. Examples of the azo-containing dicarboxylic acid, diol or diester include compounds of the following general formulas (1) to (3):

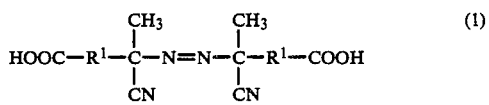

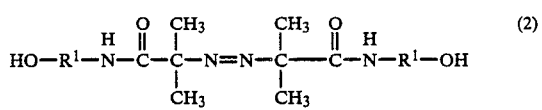

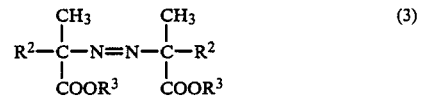

where $R^1$ represents an alkylene group having 1 to 4 carbon atoms, and $R^2$ and $R^3$ independently represent alkyl groups having 1 to 4 carbon atoms. The most preferred azo-containing dicarboxylic acid, diol and diester are 4,4'-azobis(4-cyanopentanoic acid), 2,2'-azobis[2-methyl-N-(2-hydroxyethyl)propionamide] and dimethyl 2,2'-azobisisobutyrate, respectively.

In order to carry out the radical polymerization by causing the aforesaid azo-containing dicarboxylic acid, diol or diester to function as the polymerization initiator for the vinyl monomer, the polymerization system is heated above the temperature at which the azo group decomposes.

The azo-containing dicarboxylic acid, diol or diester is preferably used in an amount of 1 to 30 mole %, more preferably 1 to 20 mole %, based on the vinyl monomer. In order to control the polymerization degree of the vinyl polymer segments, it is advisable to vary the amount of the azo-containing dicarboxylic acid, diol or diester within the aforesaid range. The use of a chain transfer agent for this purpose is undesirable because the content of terminal functional groups in the resulting vinyl polymer segments will be reduced. Most of the vinyl polymer segments formed in the above-described manner have carboxyl, hydroxyl or ester groups at both ends.

Then, the vinyl polymer segments having terminal carboxyl, hydroxyl or ester groups are mixed with the reactants used for the formation of polyester segments, i.e., a hydroxycarboxylic acid, a dicarboxylic acid, a dicarboxylic acid diester and a diol. This mixture is subjected to copolycondensation according to a well-known technique such as melt polycondensation. Thus, there is obtained a block copolymer composed of vinyl polymer segments and polyester segments. In the case of melt polycondensation, it is preferable to use a salt of antimony, titanium, tin or other metal as the catalyst. This first process can be used for the preparation of block copolymers composed of polyester segments comprising polyethylene terephthalate or polybutylene terephthalate, and vinyl polymer segments formed from a monoalkenyl aromatic compound, a maleimide or acrylonitrile. Most of the block copolymers prepared by this first process have a chemical structure of the A(B-A)$_m$ type where A and B represent a polyester segment and a vinyl polymer segment respectively.

In the second process, polycondensation for the formation of polyester segments is first carried out, preferably by interfacial polycondensation. During this polycondensation, an azo-containing dicarboxylic acid dichloride is used as a part of the dicarboxylic acid component and subjected to copoly-condensation. In this polycondensation, there may be used a catalyst selected from tertiary amines such as triethylamine, tripropylamine, etc.; quaternary ammonium compounds such as tetraethylammonium bromide, trimethylbenzylammonium chloride, etc.; and quaternary phosphonium compounds such as n-butyltriphenylphosphonium bromide, etc. Examples of the azo-containing dicarboxylic acid dichloride include compounds of the following general formula (4):

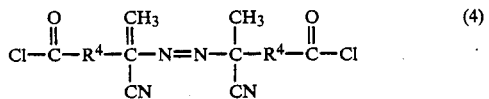

where R$^4$ represents an alkylene group having 1 to 4 carbon atoms. The most preferred azo-containing dicarboxylic acid dichloride is 4,4'-azobis(4-cyanopentanoyl chloride). The azo-containing dicarboxylic acid dichloride is preferably used in an amount of 1 to 30 mole % based on the total acid components used for the formation of polyester segments. The length of the polyester segments present in the final block copolymer can be controlled by varying the amount of the azo-containing dicarboxylic acid dichloride within the aforesaid range. In order to control the molecular weight of the polyester segments, there may also be used a molecular weight modifier selected from monohydric phenols such as phenol, cresol, xylenol, p-phenylphenol, o-phenylphenol, etc.; and alcohols. In order to suppress side reactions, this polycondensation should preferably be carried out at a temperature of 40° C. or below, more preferably 25° C. or below. Most of the polyester segments formed in the above-described manner have one or more azo groups in the polymer chain.

Then, by using these azo-containing polyester segments as the polymerization initiator, a vinyl monomer is subjected to radical polymerization. Thus, vinyl polymer segments are formed to yield a block copolymer composed of polyester segments and vinyl polymer segments. This radical polymerization is most preferably carried out by solution polymerization. In order to carry out the radical polymerization by causing the azo-containing polyester segments to function as the polymerization initiator for the vinyl monomer, the polymerization system is heated above the temperature at which the azo group decomposes. During this radical polymerization, there may be used a small amount of chain transfer agent. However, if it is used in large amounts, the block efficiency may undesirably be reduced. The length of the vinyl polymer segments is preferably controlled by varying the reaction temperature and/or the monomer concentration. This second process can be used for the preparation of block copolymers composed of polyester segments comprising an amorphous whole-aromatic polyester capable of interfacial polycondensation, and various types of vinyl polymer segments. Most of the block copolymers prepared by this second process have a chemical structure of the A(B-A)$_m$ type.

In the third process, vinyl polymer segments are first formed through radical polymerization of a vinyl monomer by using an azo-containing dicarboxylic acid dichloride as the polymerization initiator. Examples of the azo-containing dicarboxylic acid dichloride include compounds of the above general formula (4). The most preferred azo-containing dicarboxylic acid dichloride is 4,4'-azobis(4-cyanopentanoyl chloride). The azo-containing dicarboxylic acid dichloride is preferably used in an amount of 1 to 30 mole %, more preferably 1 to 20 mole %, based on the vinyl monomer. In order to control the polymerization degree of the vinyl polymer segments, it is advisable to vary the amount of the azo-containing dicarboxylic dichloride within the aforesaid range. The use of a chain transfer agent for this purpose is undesirable because the content of terminal functional groups in the resulting vinyl polymer segments will be reduced. Most of the vinyl polymer segments formed in the above-described manner have carboxylic acid chloride groups at both ends.

Then, using these vinyl polymer segments as a part of the acid component, interfacial polycondensation for the formation of polyester segments is effected to yield a block copolymer composed of polyester segments and vinyl polymer segments. In order to suppress side reactions, this polycondensation is preferably carried out at a temperature of 40° C. or below, more preferably 25° C. or below. This third process can be used for the preparation of block copolymers composed of polyester segments comprising an amorphous whole aromatic polyester capable of interfacial polycondensation, and various types of vinyl polymer segments. Most of the block copolymers prepared by this third process have a chemical structure of the A(B-A)$_m$ type.

The thermoplastic resins of the present invention can further contain various additives such as fillers, reinforcements, colorants, stabilizers or antioxidants. Moreover, the thermoplastic resins of the present invention can be pelletized according to any well-known technique such as extrusion, and then molded into articles of desired shapes and sizes according to any well-known technique such as injection molding, extrusion or pressure molding.

The present invention is further illustrated by the following examples.

In these examples, heat distortion temperature, light transmission, water absorption, birefringence and flow moldability were evaluated according to the following procedures.

(1) Heat distortion temperature

Heat distortion temperature was measured according to ASTM D-648-56.

(2) Light transmission

Light transmission was determined by using an integrating sphere type light transmission measuring apparatus and a specimen of 3 mm thickness, according to JIS K6714.

(3) Water absorption

Water absorption was determined by preparing a specimen having a thickness of 3 mm and a diameter of 50 mm and immersing it in water at 23° C. for 24 hours, according to JIS K6911.

(4) Birefringence

A disc having a thickness of 1.2 mm and a diameter of 130 mm was formed by injection molding, and mounted on a S'enarmont compensator equipped with a polarizing microscope. Using a sodium lamp as the light source, its retardation value was measured at room temperature (20° C.).

(5) Flow moldability

Using a spiral flow mold having a thickness of 1.5 mm and a width of 1 cm, the flow distance of a sample was measured on a screw in-line type injection molding machine. Measurements were made under the following conditions:

| Molding cylinder temperature | As shown in Table 1. |
|---|---|
| Mold temperature | 60° C. |
| Injection pressure | 900 kg/cm$^2$. |

EXAMPLES 1 TO 6 AND COMPARATIVE EXAMPLE 1

[Synthesis of 4,4'-azobis(4-cyanopentanoyl chloride)]

Into a 10-liter reaction vessel fitted with a stirrer and a calcium chloride tube was charged 5 liters of thionyl chloride. While this reactant was stirred at room temperature, 1.75 kg of 4,4'-azobis(4-cyanopentanoic acid) was added thereto in small portions. After completion of the addition, the reaction was continued at room temperature for 10 hours. Thereafter, the excess thionyl chloride was distilled off at room temperature under reduced pressure to obtain 1.97 kg of crystals of 4,4'-azobis(4-cyanopentanoyl chloride).

[Synthesis of an azo-containing aromatic polyester]

Into a 150-liter reaction vessel fitted with a stirrer were charged 50 liters of deionized water, 900 g of sodium hydroxide, 2.3 kg of 2,2-bis(4-hydroxyphenyl)-propane, 0.012 kg of phenol and 0.034 kg of trimethylbenzylammonium chloride. This mixture was stirred until a solution was obtained. Separately, 0.97 kg of terephthaloyl chloride, 0.97 kg of isophthaloyl chloride and 160 g of 4,4'-azobis(4-cyanopentanoyl chloride) were added to and dissolved in 25 liters of chloroform to prepare a chloroform solution.

While the reaction vessel was kept at 15° C. and its contents were stirred at high speed, the aforesaid chloroform solution was added thereto. The stirring was continued for 2 hours to complete the polymerization. Thereafter, the reaction mixture was poured into a large volume of methanol to precipitate the polymer. The precipitate so formed was washed with water and then dried at low temperature under reduced pressure to obtain an azo-containing polyester.

[Preparation of block copolymers composed of aromatic polyester segments and vinyl polymer segments]

Into a 20-liter reaction vessel fitted with a stirrer were charged the aforesaid azo-containing polyester, cyclohexanone and the respective monomer(s) shown in Table 1. These reactants were used in the respective proportions shown in Table 1. This reaction mixture was stirred at 90° C. for 8 hours to effect polymerization. After completion of the polymerization, the reaction mixture was poured into a large volume of methanol to precipitate and recover the polymer.

Each of the polymers thus obtained was pelletized according to a conventional procedure. The resulting pellets were injection molded to form specimens for the measurement of heat distortion temperature. The flow moldability of each polymer was also evaluated by injection molding. The results of evaluation are shown in Table 1.

Moreover, for purposes of comparison, an aromatic polyester was prepared without using any vinyl polymer or 4,4'-azobis(4-cyanopentanoyl chloride), and evaluated in the same manner as described above. The results of evluation are also shown in Table 1.

EXAMPLE 7

[Synthesis of a methyl carboxylate-terminated polystyrene]

Into a 100-liter reaction vessel fitted with a stirrer were charged 750 g of dimethyl 2,2'-azobisisobutyrate, 15 kg of styrene monomer and 35 kg of benzene. While nitrogen gas was slowly passed through the reaction vessel, this reaction mixture was heated at 80° C. for 10 hours to effect polymerization. After completion of the polymerization, the reaction vessel was cooled to room temperature and the reaction mixture was quickly removed therefrom. Then, the reaction mixture was poured into a large volume of methanol to precipitate the polymer. The precipitate so formed was washed with water and then dried under reduced pressure to obtain a methyl carboxylate-terminated polystyrene.

[Preparation of a block copolymer of polyethylene terephthalate and polystyrene]

Into a reaction vessel fitted with a stirrer were charged 0.97 kg of dimethyl terephthalate, 0.62 kg of ethylene glycol and 0.96 kg of the methyl carboxylate-terminated polystyrene. Then, 10 ml of a 1% solution of butyl titanate [Ti(OBu)$_4$] was added thereto as a catalyst. While nitrogen gas was introduced into the reaction vessel placed on an oil bath, the reaction mixture was heated, with stirring, from 150° C. to 250° C. over a period of 4 hours. Subsequently, the reaction mixture was heated from 250° C. to 270° C. over a period of 1 hour, during which time the pressure was gradually reduced and adjusted to 0.5 mmHg when the maximum temperature of 270° C. was reached. Thereafter, the stirring was continued at 270° C. and 0.5 mmHg for 3 hours to complete the reaction. The polymer thus obtained was evaluated in the same manner as described in Example 1. The results of evaluation are shown in Table 1.

EXAMPLE 8

[Preparation of a block copolymer of polybutylene terephthalate and polystyrene]

Polycondensation was carried out in the same manner as described in Example 7, except that the ethylene glycol was replaced by 0.9 kg of 1,4-butanediol, the methyl carboxylate-terminated polystyrene was used in an amount of 1.1 kg, and the maximum temperature was altered to 250° C. The polymer thus obtained were evaluated in the same manner as described in Example 1. The results of evaluation are shown in Table 1.

COMPARATIVE EXAMPLES 2-4

Commercially available polyethylene terephthalate and polybutylene terephthalate were evaluated in the same manner as described in Example 1. The results of evaluation are shown in Table 1.

EXAMPLES 11 AND 12

In Examples 11 and 12, the polymers prepared in Examples 4 and 5, respectively, were molded and evaluated in the same manner as described in Example 10. The results of evaluation are shown in Table 2.

EXAMPLE 13

A block copolymer was prepared in the same manner as described in Example 1, except that the styrene was replaced by a vinyl monomer mixture composed of styrene and α-methylstyrene in a weight ratio of 80:20. The block copolymer thus obtained was evaluated in the same manner as described in Example 10. The results of evaluation are shown in Table 2.

EXAMPLE 14

A block copolymer was prepared in the same manner as described in Example 1, except that the styrene was

TABLE 1

| | Composition of polymer | | | | Results of evaluation | | Molding |
|---|---|---|---|---|---|---|---|
| | | Vinyl polymer segments | | Weight ratio of polyester segments to vinyl polymer segments | | Flow distance (cm) | cylinder temperature (°C.) |
| | Polyester segments | Type of monomer(s) | Molar ratio | | HDT (°C.) | | |
| Example 1 | Azo-containing aromatic polyester | Styrene | — | 100 | 50/50 | 130 | 37 | 300 |
| Example 2 | Azo-containing aromatic polyester | " | Acrylonitrile | 70/30 | 50/50 | 135 | 34 | 300 |
| Example 3 | Azo-containing aromatic polyester | " | Phenylmaleimide | 50/50 | 50/50 | 140 | 25 | 300 |
| Example 4 | Azo-containing aromatic polyester | " | — | 100 | 70/30 | 165 | 20 | 300 |
| Example 5 | Azo-containing aromatic polyester | " | — | 100 | 30/70 | 110 | 50 | 300 |
| Example 6 | Azo-containing aromatic polyester | Methyl methacrylate | — | 100 | 50/50 | 134 | 35 | 300 |
| Example 7 | Polyethylene terephthalate | Styrene | — | 100 | 50/50 | 80 | 30 | 265 |
| Example 8 | Polybutylene terephthalate | " | — | 100 | 50/50 | 75 | 35 | 240 |
| Comparative Example 1 | Azo-free aromatic polyester | — | — | 100 | — | 180 | 0 (no flow) | 300 |
| Comparative Example 2 | Commerical polystyrene | — | — | — | — | 88 | 60 or greater | 300 |
| Comparative Example 3 | Commercial polyethylene terephthalate | — | — | — | — | 70 | 10 | 265 |
| Comparative Example 4 | Commercial polybutylene terephthalate | — | — | — | — | 65 | 15 | 240 |

EXAMPLE 9

A block copolymer was prepared in the same manner as described in Example 1, except that the styrene was replaced by butyl acrylate. After completion of the polymerization, the reaction mixture was poured into a large volume of methanol to precipitate and recover the polymer.

The polymer thus obtained was hot-pressed at 260° C. to form a film. Thus, there was obtained a transparent elastic film.

EXAMPLE 10

The polymer prepared in Example 1 was injection-molded to form specimens having specific shapes. Using these specimens, the light transmission, retardation and water absorption of the polymer were evaluated. The results of evaluation are shown in Table 2.

replaced by a vinyl monomer mixture composed of styrene and methyl methacrylate in a weight ratio of 70:30. The block copolymer thus obtained was molded and evaluated in the same manner as described in Example 10. The results of evaluation are shown in Table 2.

COMPARATIVE EXAMPLES 5 TO 8

In Comparative Examples 5 and 6, the azo-free aromatic polyester used in Comparative Example 1 and the commercial available polystyrene used in Comparative Example 2, respectively, were evaluated in the same manner as described in Example 10. Moreover, in Comparative Examples 7 and 8, a commercially available polycarbonate resin and a commercially available polymethyl methacrylate resin, respectively, were evaluated in the same manner as described above. The results of evaluation are shown in Table 2.

TABLE 2

|  | Light transmission (%) | Retardation (nm) | Water absorption (%) |
| --- | --- | --- | --- |
| Example 10 | 88 | 25 | 0.1 |
| Example 11 | 88 | 40 | 0.15 |
| Example 12 | 88 | −30 | 0.05 |
| Example 13 | 88 | 30 | 0.1 |
| Example 14 | 88 | 30 | 0.15 |
| Comparative Example 5 | 89 | 150 | 0.2 |
| Comparative Example 6 | 88 | −80 | 0.01 |
| Comparative Example 7 | 88 | 150 | 0.2 |
| Comparative Example 8 | 93 | 15 | 0.4 |

EXAMPLE 15

[Synthesis of a hydroxyl-terminated polystyrene]

Into a 100-liter reaction vessel fitted with a stirrer were charged 750 g of 2,2'-azobis[2-methyl-N-(2-hydroxyethyl)propionamide], 15 kg of styrene monomer, 30 kg of benzene and 5 kg of methyl ethyl ketone. While nitrogen gas was slowly passed through the reaction vessel, this reaction mixture was heated at 80° C. for 10 hours to effect polymerization. After completion of the polymerization, the reaction vessel was cooled to room temperature and the reaction mixture was quickly removed therefrom. Then, the reaction mixture was poured into a large volume of methanol to precipitate the polymer. The precipitate so formed was washed with water and then dried under reduced pressure to obtain a hydroxyl-terminated polystyrene.

[Preparation of a block copolymer of polybutylene terephthalate and polystyrene]

Using 0.97 kg of dimethyl terephthalate, 0.9 kg of 1,4-butanediol and 1.1 kg of the hydroxyl-terminated polystyrene, polycondensation was carried out under the same conditions as employed in Example 8 to prepare a block copolymer of polybutylene terephthalate and polystyrene. When this copolymer was evaluated in the same manner as described in Example 1, its heat distortion temperature was 75° C. and its flow distance was 35 cm (at a molding cylinder temperature of 240° C.).

EXAMPLE 16

[Synthesis of an acid chloride-terminated polystyrene]

Into a 100-liter reaction vessel fitted with a stirrer were charged 1 kg of 4,4'-azobis(4-cyanopentanoyl chloride), 15 kg of styrene monomer and 30 kg of benzene. While nitrogen gas was slowly passed through the reaction vessel, this reaction mixture was heated at 80° C. for 10 hours to effect polymerization. After completion of the polymerization, the reaction mixture within the reaction vessel was cooled to room temperature. Then, the reaction mixture was poured into a large volume of hexane to precipitate the polymer. Thereafter, the precipitate so formed was dried to obtain an acid chloride-terminated polystyrene.

[Preparation of a block copolymer of an aromatic polyester and polystyrene]

Into a 150-liter reaction vessel fitted with a stirrer were charged 30 liters of deionized water, 0.45 kg of sodium hydroxide, 1.14 kg of 2,2-bis(4-hydroxyphenyl)propane and 0.017 kg of trimethylbenzylammonium chloride. This mixture was stirred until a solution was obtained. Separately, 0.485 kg of terephthaloyl chloride, 0.485 kg of isophthaloyl chloride and 1.8 kg of the acid chloride-terminated polystyrene were added to and dissolved in 50 liters of chloroform to prepare a chloroform solution.

While the reaction vessel was kept at 15° C. and its contents were stirred at high speed, the aforesaid chloroform solution was added thereto. The stirring was continued for 2 hours to complete the polymerization. Thereafter, the reaction mixture was poured into a large volume of methanol to precipitate the polymer. The precipitate so formed was washed with water and then dried to obtain a block copolymer of an aromatic polyester and polystyrene. When this copolymer was evaluated in the same manner as described in Example 1, its heat distortion temperature was 130° C. and its flow distance was 38 cm (at a molding cylinder temperature of 300° C.).

What is claimed is:

1. A thermoplastic resin comprising a block copolymer composed of amorphous polyester segments consisting essentially of an aromatic dicarboxylic acid component and an aromatic diol component, and vinyl polymer segments formed from at least one monomer selected from styrene, a derivative thereof and a vinyl monomer copolymerizable therewith, wherein styrene and/or the derivative thereof is present in an amount of not less than 50 mole %.

2. A thermoplastic resin as claimed in claim 1 wherein the diol component constituting the polyester segments consist essentially of 2,2'-bis(4-hydroxyphenyl)propane.

3. A thermoplastic resin as claimed in claim 1 wherein the dicarboxylic acid component constituting the polyester segments consist essentially of terephthalic acid and/or isophthalic acid.

4. A thermoplastic resin as claimed in claim 1 which has high resistance to moisture absorption and excellent optical properties and wherein the diol component constituting the polyester segments consists essentially of 2,2-bis(4-hydroxyphenyl)propane, and the dicarboxylic acid component constituting the polyester segment consists essentially of terephthalic acid and/or isophthalic acid.

5. A thermoplastic resin as claimed in claim 1 wherein the polyester segments and the vinyl polymer segments are present in a weight ratio ranging from 80:20 to 20:80.

6. An optical resin comprising a block copolymer composed of at least one amorphous polyester segment formed essentially from 2,2-bis(4-hydroxyphenyl)propane and terephthalic acid and/or isophthalic acid, and at least one vinyl polymer segment comprising a polystyrene resin.

* * * * *